US012662063B2

(12) United States Patent
  Wall

(10) Patent No.: US 12,662,063 B2
(45) Date of Patent: Jun. 23, 2026

(54) DISPLAY DEVICE AND MOTOR VEHICLE WITH A DISPLAY DEVICE, AND METHOD FOR DISPLAYING DISPLAY CONTENT

(71) Applicant: AUDI AG, Ingolstadt (DE)

(72) Inventor: Christian Wall, Hitzhofen (DE)

(73) Assignee: AUDI AG, Ingolstadt (DE)

( * ) Notice: Subject to any disclaimer, the term of this patent is extended or adjusted under 35 U.S.C. 154(b) by 99 days.

(21) Appl. No.: 17/910,147

(22) PCT Filed: Mar. 8, 2021

(86) PCT No.: PCT/EP2021/055722
    § 371 (c)(1),
    (2) Date: Sep. 8, 2022

(87) PCT Pub. No.: WO2021/180617
    PCT Pub. Date: Sep. 16, 2021

(65) Prior Publication Data
    US 2023/0095308 A1     Mar. 30, 2023

(30) Foreign Application Priority Data
    Mar. 12, 2020    (DE) ..................... 10 2020 106 832.8

(51) Int. Cl.
    *B60K 35/10*        (2024.01)
    *B60K 35/60*        (2024.01)
                (Continued)
(52) U.S. Cl.
    CPC .......... *B60R 11/0229* (2013.01); *B60K 35/60* (2024.01); *B60K 35/80* (2024.01);
                (Continued)
(58) Field of Classification Search
    CPC ......... B60R 11/0229; B60R 2011/0005; B60R 2011/0085; B60R 2011/0092;
                (Continued)

(56) References Cited

U.S. PATENT DOCUMENTS

| 2012/0188650 A1 | 7/2012 | Rumpf et al. | |
| 2021/0206265 A1* | 7/2021 | Song | B60K 35/10 |
| 2021/0213830 A1* | 7/2021 | Son | B60K 35/10 |

FOREIGN PATENT DOCUMENTS

| CN | 104908664 A | 9/2015 |
| DE | 101 15 050 A1 | 10/2002 |
| | (Continued) | |

OTHER PUBLICATIONS

English Translation by WIPO of Preliminary Report on Patentability dated Sep. 6, 2022 in International Patent Application No. PCT/EP2021/055722.

(Continued)

*Primary Examiner* — Hesham K Abouzahra
(74) *Attorney, Agent, or Firm* — STAAS & HALSEY LLP

(57)             ABSTRACT

A screen device and a stowage volume are provided in a display device. The screen device is mounted so as to be displaceable through an opening of the stowage volume along a predetermined displacement direction between a stowed position and at least one use position, which is different than the stowed position, out of an interior space of the stowage volume and into the interior space of the stowage volume. The display device has a support element which extends away from the interior space of the stowage volume proceeding from the opening along the predetermined displacement direction and is designed to mechanically support the screen device in a state in which it is at least partly pushed out of the stowage volume.

18 Claims, 4 Drawing Sheets

(51) Int. Cl.

| | |
|---|---|
| *B60K 35/80* | (2024.01) |
| *B60K 35/81* | (2024.01) |
| *B60R 11/02* | (2006.01) |
| *B60K 35/22* | (2024.01) |
| *B60R 11/00* | (2006.01) |

(52) U.S. Cl.
CPC .............. *B60K 35/81* (2024.01); *B60K 35/10* (2024.01); *B60K 35/22* (2024.01); *B60K 35/223* (2024.01); *B60K 2360/1438* (2024.01); *B60R 2011/0005* (2013.01); *B60R 2011/0085* (2013.01); *B60R 2011/0092* (2013.01)

(58) Field of Classification Search
CPC ........ B60K 35/60; B60K 35/10; B60K 35/22; B60K 35/223; B60K 35/53; B60K 35/81; B60K 2360/1438; B60K 35/00
See application file for complete search history.

(56) References Cited

FOREIGN PATENT DOCUMENTS

| | | | |
|---|---|---|---|
| DE | 10-2008 051 153 A1 | 4/2010 | |
| DE | 20 2014 100 468 U1 | 4/2014 | |
| DE | 102014006338 A1 * | 11/2015 | ........... B60K 35/223 |
| DE | 10 2015 005 365 A1 | 10/2016 | |
| DE | 10 2015 011 614 A1 | 3/2017 | |
| WO | 2020/030465 A1 | 2/2020 | |

OTHER PUBLICATIONS

German Office Action dated Feb. 24, 2021 in German Patent Application No. 10 2020 106 832.8.
PCT/EP2021/055722, Mar. 8, 2021, Christian Wall, AUDI AG.
10 2020 106 832.8, Mar. 12, 2020, Christian Wall, AUDI AG.
Chinese Office Action dated Mar. 31, 2025 for parallel Chinese Application No. 202180019794.4, 12 pages.

* cited by examiner

DISPLAY DEVICE AND MOTOR VEHICLE WITH A DISPLAY DEVICE, AND METHOD FOR DISPLAYING DISPLAY CONTENT

CROSS REFERENCE TO RELATED APPLICATIONS

This application is a U.S. national stage of International Application No. PCT/EP2021/055722, filed on Mar. 8, 2021. The International Application claims the priority benefit of German Application No. 10 2020 106 832.8 filed on Mar. 12, 2020. Both the International Application and the German Application are incorporated by reference herein in their entirety.

BACKGROUND

Described below is a display device with a screen device for displaying display content. The display device is suitable in particular for displaying the display content in a passenger compartment of a motor vehicle. Also described are a motor vehicle having a display device of this type and a method for displaying the display content by the display device.

In the course of technical development and particularly in association with the development of partially or fully autonomous motor vehicles, the trend is toward ever larger screens or screen devices in the passenger compartment which are designed to provide an observer with a variety of display content or information. The latter includes not only travel- and/or vehicle-related information, such as, for example, a current travel speed and/or route data (navigation data), but also entertainment offerings, such as games and/or films. This has the consequence that a respective size of a screen or of a display does not always optimally match the respective display content. In this regard, it can happen that information that could be displayed on a comparatively small area is displayed on an unnecessarily large display or screen, which can otherwise adversely influence an observer's view of the traffic situation. If a screen is chosen to be smaller in order to avoid this effect, it can happen that films, for example, cannot be displayed in a desired picture size. There is therefore a need for display devices having variable-size screens.

DE 10 2014 006 338 A1 and DE 101 15 050 A1 disclose in each case display devices comprising variable-size screens for motor vehicles or other means of transport. The screens are in each case mounted so as to be displaceable out of the housing into a passenger compartment. Since the screens described are flexible or compliant screens, a mechanical support element arrangement has to be provided in each case in order to mechanically support the respective screen. When a respective screen is displaced, the support element arrangements are concomitantly guided or entrained with the screen. What is disadvantageous about the display devices described is that a respective support element arrangement has movable parts and is thus susceptible to wear.

DE 10 2015 011 614 A1 also describes a display device comprising a flexible screen for a motor vehicle. A flexible display element is supported by a planar support element and can be brought into different positions by pivoting of the support element. Disadvantageously, a housing within which the screen can be stowed and thus protected against external influences is not provided.

SUMMARY

Described below is a low-wear and robust display device having a size-adjustable screen for a motor vehicle.

The display device has a screen device or a screen and a stowage volume. The stowage volume can be designed as a stowage container or a housing, in particular an at least regionally open housing having at least one opening. The stowage volume can have one or more open sides. The screen device is mounted so as to be displaceable through the opening of the stowage volume along a predetermined displacement direction between a stowed position and at least one use position, which is different than the stowed position, out of an interior space of the stowage volume and back into the interior of the stowage volume.

For the case where the display device is used in a motor vehicle, provision can be made for the display device to be arranged in the region of a control panel or a dashboard of a motor vehicle. The display device may be installed in the motor vehicle in such a way that the screen device is displaceable from a stowed position that is not, or not completely, visible to a respective occupant of the motor vehicle or observer into an at least partly visible use position into the passenger compartment.

The displaceable mounting of the display enables a respective display region to be provided in line with requirements and in a manner adapted to respective display content. In this regard, a respective size of a display region can be chosen and set in line with requirements. By way of example, the respective size of the screen device can be chosen and set depending on a respective space requirement of respective display content. In other words, a respective use position of the screen device can be selected in line with requirements and in a manner adapted to respective display content.

The screen device may include a display for displaying display content. The display may have a continuous display surface. The display surface may be formed or provided by a display layer for displaying pixel-based display content. Such a display layer can be for example an OLED layer (OLED—organic light emitting diode).

The display device has a support element which extends away from the interior space of the stowage volume proceeding from the opening along the predetermined displacement direction and is designed to mechanically support the screen device in a state in which it is at least partly pushed out of the stowage volume. The support element is designed as a stationary support element, which can be realized for example as a support plate or a support arm or an arrangement of at least two support arms. The support element is attached at the opening of the stowage volume. Proceeding from the opening or proceeding from an attachment position at the opening, the support element extends away from the interior space of the stowage volume or stowage container. The support element can also be designed as a support wedge, wherein an end face of the support wedge extends away from the interior space of the stowage volume proceeding from the opening along the predetermined displacement direction. In any case the support element is designed to mechanically support the screen device in a state in which it is at least partly pushed out of the stowage volume.

In contrast to the known solutions, the support element is designed to be stationary or with a fixed height. In other words, the support element itself is not variable in its shape. This advantageously reduces the susceptibility of the entire display device to wear.

One embodiment provides for the support element to have at least one guide element, wherein the screen device is positively guided by the at least one guide element along the predetermined displacement direction in an extension of the support element. The guide element can be designed as a linear guide element, for example. A linear guide element can be designed for example as a clip at least partly encompassing the screen device. The screen device may have lateral slot guides, with lateral limbs of the clip described engaging into the slot guides. This advantageously ensures that the screen device does not get stuck or caught during displacement along the predetermined displacement direction. This is advantageous particularly if the screen device is intended to be displaced out of the stowed position into a use position projecting beyond the support element or beyond the fixed height of the support element.

A further embodiment provides for the display device to have a pivoting mechanism. The pivoting mechanism is designed to displace the screen device between the stowed position and the at least one use position, which is different than the stowed position, depending on a control signal. The control signal can be coupled to the display content, for example. In other words, a control device, for example a control device of the motor vehicle, can be designed to generate the control signal depending on a size of the screen device that is required for displaying the respective display content, and to communicate the control signal to the display device.

The pivoting mechanism may be arranged in the interior space of the stowage volume and is designed to push the screen device from the stowed position, continuously variably depending on the control signal, into at least one intermediate position and to keep it there. The pivoting mechanism can have for example a central drive unit and a pivoting arm. The pivoting arm is connected to the drive unit at a first end and to a base region of the screen device at a second end arranged opposite the first end. An exemplary embodiment of drive unit and pivoting arm will be described in detail hereinafter.

A further embodiment provides for the screen device to have a first display region and a second display region adjacent to the first display region. The first display region of the screen device has a first height and a first inherent stiffness. The second display region has a second height and a second inherent stiffness, wherein the second inherent stiffness is reduced relative to the first inherent stiffness. The second inherent stiffness can be reduced by 30 to 70 percent relative to the first inherent stiffness. The second inherent stiffness may be 50 percent of the first inherent stiffness. In other words, in the region of the second display region the screen device may be half as inherently stiff as within the first display region. The first inherent stiffness may be chosen in such a way that the screen device is designed to be stable or dimensionally stable within the first display region automatically, in particular without external mechanical support. In contrast thereto, the second inherent stiffness may be selected in such a way that the screen device is not stable in the region of the second display region. In other words, the screen device is configured to be compliant or flexible within the second display region. In other words, the screen device can be curvable within the second display region with application of an externally active force such as can be applied to the screen device by touch operation on the part of the observer, for example.

The screen device may be arranged in the stowage volume in a curved fashion at least regionally within the second display region. The described curvability of the screen device within the second display region affords the advantage that the screen device can be stowed in the stowage volume or stowage container in a particularly space-saving manner and in a curved fashion or even in a rolled-up fashion.

The first inherent stiffness may be caused by a materially and/or structurally stiffened carrier layer arranged on the screen device within the first display region. In other words, a stiffened carrier layer is attached to a rear side of the screen device within the first display region, the rear side being arranged opposite the display layer. The carrier layer can be formed from a hard plastic or aluminum or an aluminum alloy, for example. It can also have structural elements or struts for structural stiffening. As described above, the display layer may be a flexible OLED layer. Such an OLED layer is flexible or compliant. Within the first display region, the screen device may have a composite layer with an OLED layer and a stiffened carrier layer, while within the second display region the stiffened carrier layer is entirely or partly absent and the screen device only has the flexible OLED layer. As a result, a continuous display layer can be provided which nevertheless has regionally different inherent stiffnesses.

One particularly advantageous development provides for the fixed height of the support element to correspond at least to the first height of the first display region, wherein in the stowed position an upper edge of the first display region terminates flush with an upper edge of the support element. In other words, the support element is of substantially exactly the same height as the first display region in the stowed position. In the use position and/or the intermediate position, by contrast, the first display region may project beyond the upper edge of the support element at least in sections, wherein the second display region, which, after all, is configured to be flexible, is supported by the support element at least in sections and thus advantageously withstands touch operation on the part of a user, for example.

The display device thus may have a screen device with a touch-sensitive sensor layer. In other words, the screen device is designed as a touch-sensitive display or as a touch display or a touchscreen. By virtue of the support element described, the screen device is supported in such a way that touch operation of the screen device is made possible.

The motor vehicle has a display device of the type described. The motor vehicle may be an automobile, in particular as a car or truck, or as a passenger bus or motorcycle. As described in the introduction, the display device may be arranged in the region of a control panel or dashboard of the motor vehicle. In particular, the display device can be arranged in a manner concealed below a control panel such that in the stowed position the screen device is not visible, or is only partly visible, to a vehicle occupant.

In the method for displaying display content by a display device, the display device has a screen device and a stowage volume, and the screen device is mounted so as to be displaceable through an opening of the stowage volume along a predetermined displacement direction between a stowed position and at least one use position, which is different than the stowed position, out of an interior space of the stowage volume and into the interior space of the stowage volume.

The method is characterized in that a support element is provided which extends away from the interior space of the stowage volume proceeding from the opening along the predetermined displacement direction and mechanically supports the screen device in a state in which it is at least partly pushed out of the stowage volume.

The method includes developments which have features such as have already been described in association with the developments of the display device and/or of the motor vehicle. For this reason, the corresponding developments of the method are not described once again here.

The abovementioned control device for the motor vehicle has a processor device configured to carry out an embodiment of the method. For this purpose, the processor device can have at least one microprocessor and/or at least one microcontroller and/or at least one FPGA (field programmable gate array) and/or at least DSP (digital signal processor). Furthermore, the processor device can have program code configured, when executed by the processor device, to carry out the embodiment of the method. The program code can be stored in a data memory of the processor device.

The invention also encompasses the combinations of the features of the embodiments described.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
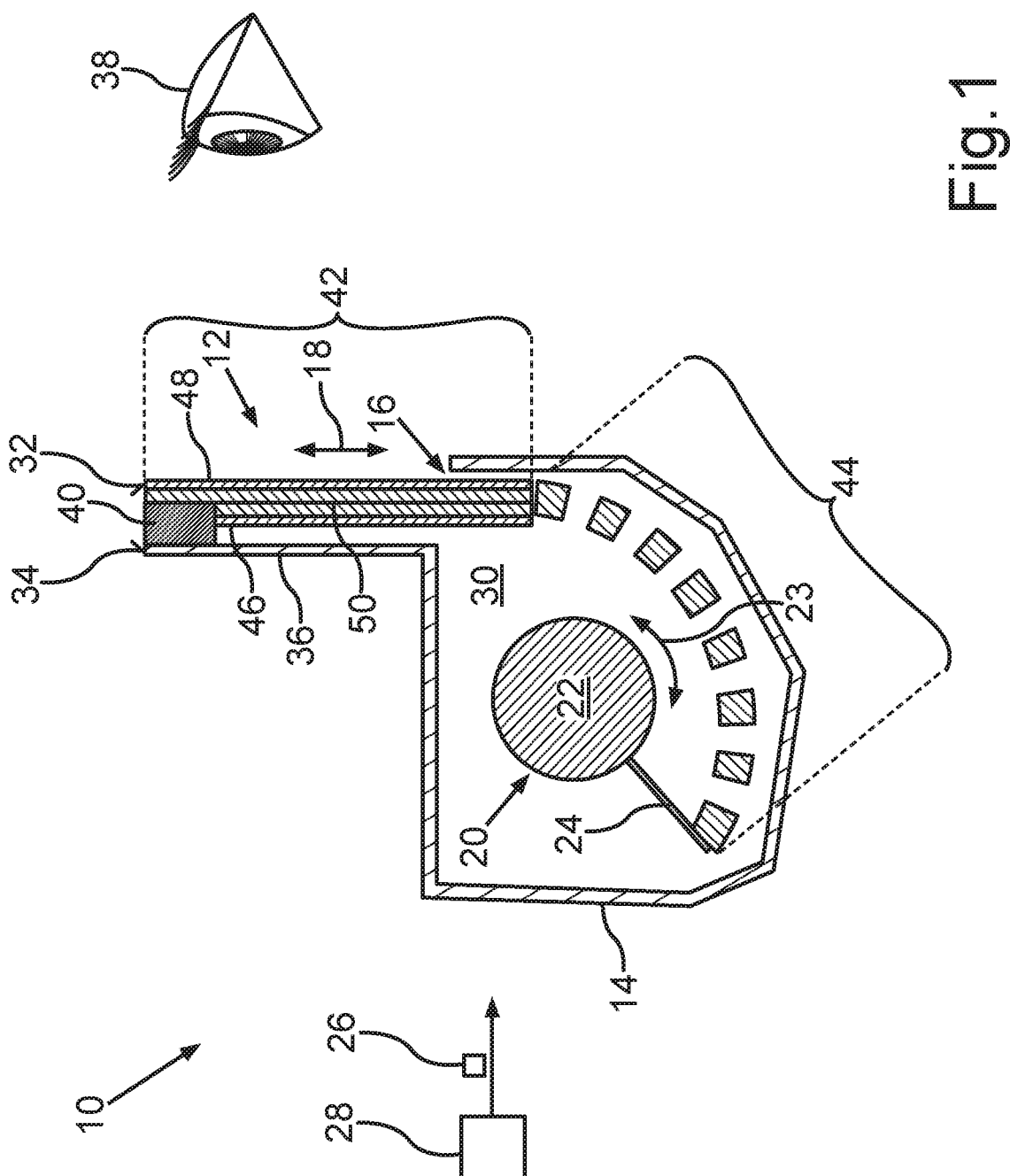
FIG. 1 is a schematic longitudinal sectional view of a display device, with a screen device being situated in a possible stowed position.

In the exemplary embodiments, the described components of the embodiments each constitute individual features which are to be considered independently of one another and which each also develop the invention independently of one another. Therefore, the disclosure is also intended to encompass combinations of the features of the embodiments other than those presented. Furthermore, the described embodiments are also able to be supplemented by further features from among those already described.

In the figures, identical reference characters in each case designate functionally identical elements.

FIG. 1 shows a schematic longitudinal sectional illustration of a display device 10. The display device 10 has a screen device 12 and a stowage volume 14 embodied as a stowage container. The screen device 12 can be displaced or pushed back and forth through an opening 16 of the stowage volume 14 along a predetermined displacement direction 18 between a stowed position and a use position. The display device 10 can have a pivoting mechanism 20 having a drive unit 22 and a pivoting arm 24 mounted on the drive unit 22. The pivoting arm 24 can be secured to one end of the screen device 12.

In order to realize displacement of the screen device 12 along the displacement direction 18, the drive unit 22 can transmit a rotational force 23 to the pivoting arm 24 and thus to the end of the screen device 12. The rotational force 23 can be generated for example depending on a control signal 26 communicated to the display device 10 by a control device 28. The pivoting mechanism 20 may be arranged in an interior space 30 of the display device 10, in particular of the stowage volume 14, and can push the screen device 12 out of the stowage volume 14 and pull it into the stowage volume 14 along the displacement direction 18 continuously variably and depending on the control signal 26.

Furthermore, FIG. 1 shows a support element 36 which attaches at the opening 16 and extends away from the interior space 30 of the stowage volume 14.

FIG. 1 shows by way of example an arrangement of the screen device 12 in a stowed position. The stowed position shown is characterized in that an upper edge 32 of the screen device 12 terminates flush with an upper edge 34 of the support element 36. The support element 36 in the stowed position shown in FIG. 1 is accordingly not visible to an eye 38 of an observer or user.

In the stowed position shown in FIG. 1, a first display region 42 projects, at least for the most part, out of the interior space 30 of the stowage volume 14, while a second display region 44 is stowed in a curved fashion within the stowage volume 14. In order to be able to realize the curvature shown in FIG. 1 within the second display region 44, the screen device 12 can be embodied as flexible or compliant within the second display region 44. Within the first display region 42, by contrast, the screen device 12 may be equipped with an increased inherent stiffness relative to the second display region 44. This increase in inherent stiffness can be obtained by a carrier layer 46 being fitted at the rear side. On a side of the screen device 12 that faces away from the carrier layer 46 and faces the observer's eye 38, there is arranged a display layer 48 for displaying pixel-based display content on the screen device 12. The display layer 48 can extend over an entire length of the screen device, that is to say over first and second display regions 42, 44. A continuous display of display content is thus ensured.

Between carrier layer 46 and display layer 48, a slot 50 can be integrated in the screen device 12. The slot 50 can serve as an engagement location for a guide element 40.

In order to realize guidance of the screen device 12 during displacement along the displacement direction 18, a guide element 40 can thus be provided.

Figures 2, 3:
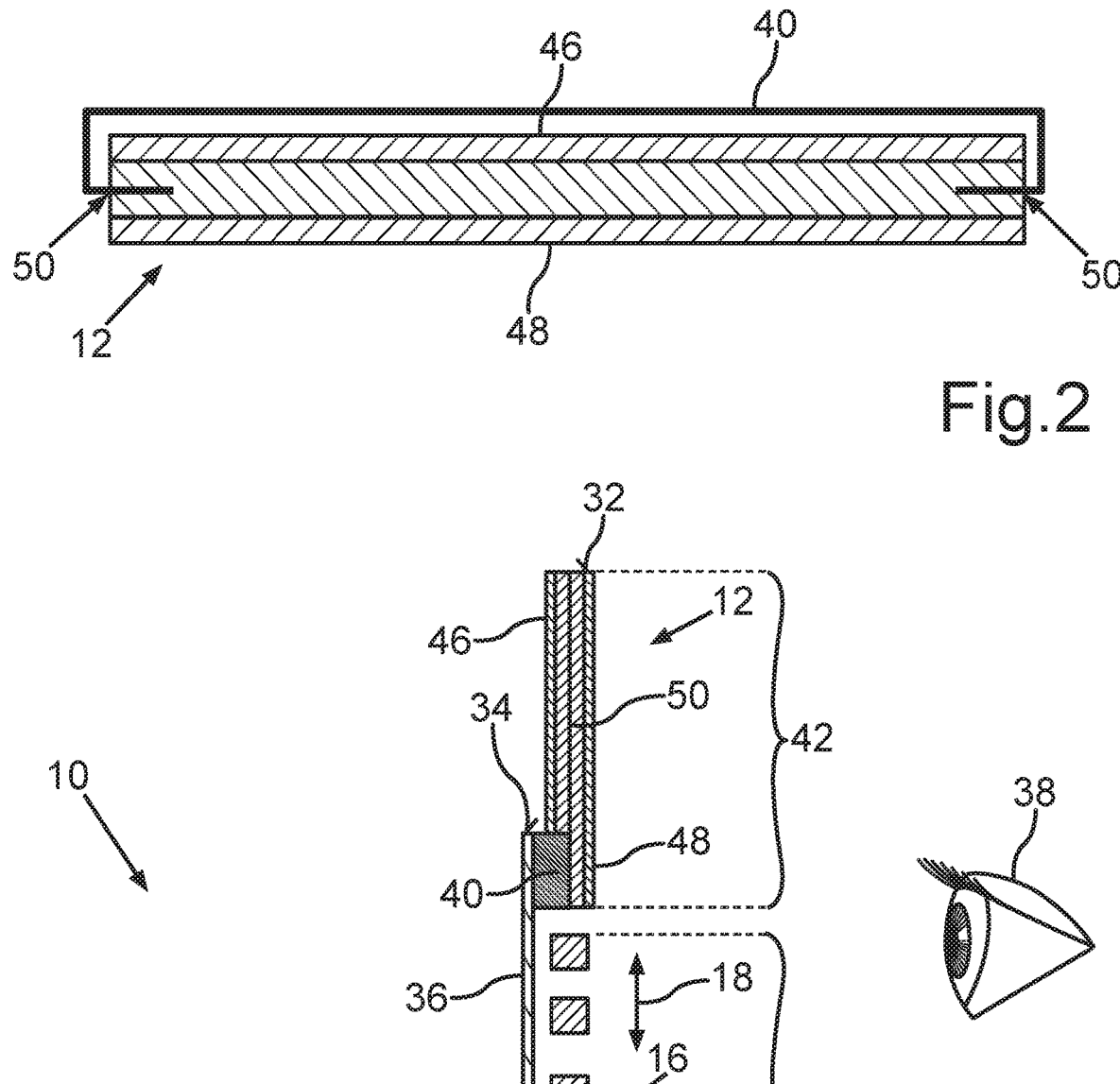
FIG. 2 is a schematic cross-sectional illustration of a screen device and support element.
FIG. 3 is a schematic illustration of a display device with a screen device pushed at least partly out of a stowage volume.

With reference to the components designated and described in association with FIG. 1, FIG. 2 shows a schematic cross-sectional illustration of the screen device 12 with a guide element 40 guided laterally in a slot 50 of the screen device 12.

With reference to the components designated and described in association with FIGS. 1 and 2, FIG. 3 shows an arrangement of the screen device 12 in a use position, which is different than the stowed position. In the use position, the screen device 12 can be pushed out of the stowage volume 14 in such a way that the first display region 42 projects completely or at least almost completely beyond the support element 36. In other words, in the use position shown in FIG. 3, the first display region 42 projects beyond the upper edge 34 of the support element 36 at least in sections. In addition, the second display region 44 is supported by the support element 36 at least in sections. Consequently, an enlarged display surface can be provided to the observer's eye 38 in the use position.

In the stowed position described, the observer can select for example navigation software on a screen device 12 embodied as a touchscreen. Owing to this selection, the control device 28 can transmit a corresponding control signal 26 to the display device 10. The drive unit 22 can thereupon exert a rotational force 23 on the pivoting arm 24, and thus displace the screen device 12 from the stowed position into the use position shown in FIG. 3. A map representation of the selected navigation software can then advantageously be represented in an enlarged manner.

Figure 4:
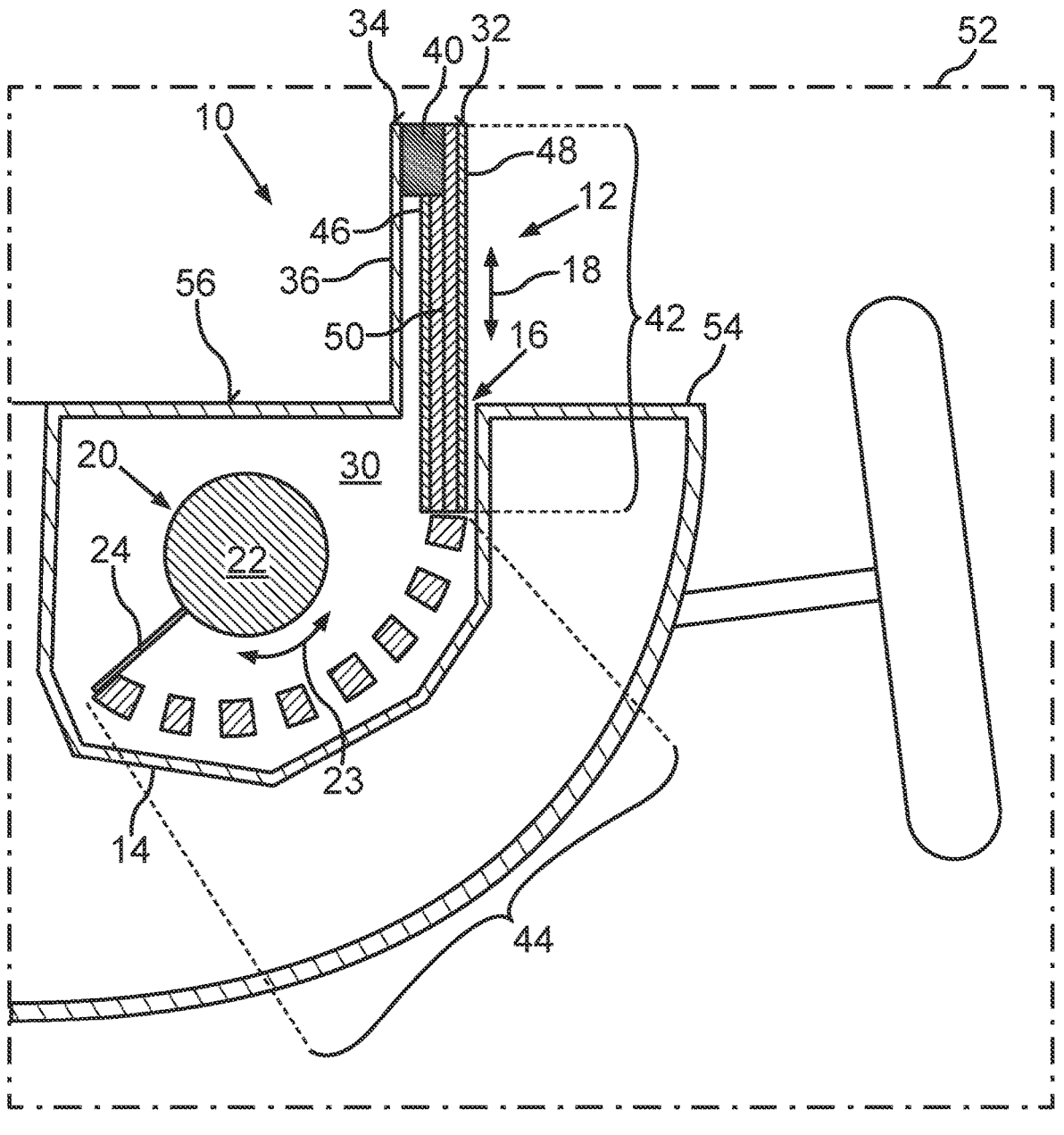
FIG. 4 is a schematic illustration of a detail of a motor vehicle with a display device arranged in the motor vehicle.

With reference to the components described and shown in FIGS. 1 to 3, FIG. 4 shows one exemplary possibility for the arrangement of the display device 10 in a motor vehicle 52. In FIG. 4, the display device 10 is integrated by way of example in a control panel 54 of the motor vehicle 52. In other words, a surface 56 of the control panel 54 forms a part of the stowage volume 14 or of the stowage container. The screen device 12 can thus be displaced through an opening 16 within the surface 56 of the control panel 54.

Figure 5:
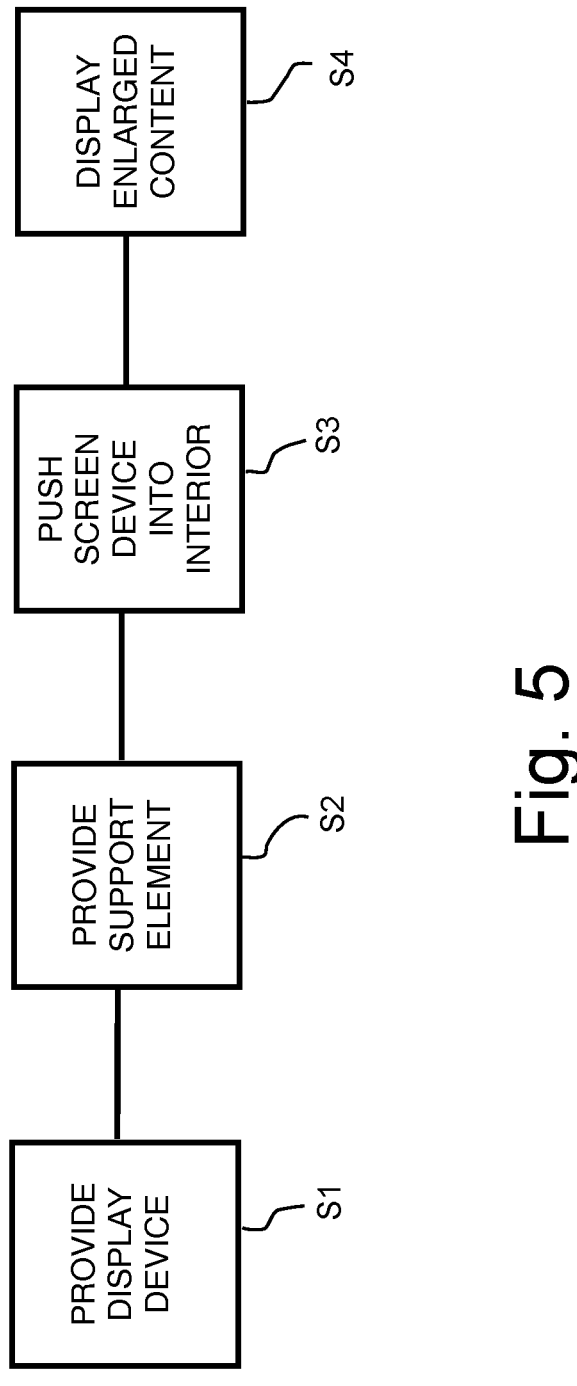
FIG. 5 is a flowchart of a method for displaying display content.

FIG. 5 shows a schematic illustration of a method for displaying display content by a display device 10. First, S1 involves providing a display device 10 having a screen device 12 and a stowage volume 14, wherein the screen device 12 is mounted so as to be displaceable through an opening 16 of the stowage volume 14 along a predetermined displacement direction 18 between a stowed position and at least one use position, which is different than the stowed position, out of an interior space 30 of the stowage volume 14 and into the interior space 30 of the stowage volume 14. Next, S2 involves providing a support element 36 for the display device 10. The support element 36 extends away from the interior space 30 of the stowage volume 14 proceeding from the opening 16 along the predetermined displacement direction 18. Next, S3 involves pushing the screen device out of the interior space 30 depending on a control signal 26. In this case, the support element 36 mechanically supports the screen device 12. In S4, enlarged display content can then be displayed on the stowage volume 12 that has been pushed out in this way.

In one arrangement, a first rigid portion or a first display region of the screen device described is thus situated outside a control panel structure of a motor vehicle. A second portion or second display region may have flexible design and may be extended by suitable kinematics or by a pivoting mechanism. The housing or the stowage volume can be designed such that it has a support structure or a support element on the rear side, which is as high as the rigid portion in a non-extended state or in a stowed position. The support structure is then visually imperceptible to an observer. If the flexible portion or the second display region is extended, then the entire unit or the entire screen device can be supported on the support structure of the housing in the case of touch operation.

Overall, the examples show how an arrangement for an extendible or displaceably mounted flexible or compliant display can be provided.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A display device, comprising:
a stowage volume, having an opening;
a screen device displaceable through the opening of the stowage volume along a predetermined displacement direction between a stowed position and at least one use position, different than the stowed position, out of an interior space of the stowage volume and back into the interior space of the stowage volume, the screen device including a first display region being rigid, a second display region being flexible, and a display layer extending over the first display region and the second display region; and
a support element which extends away from the interior space of the stowage volume proceeding from the opening along the predetermined displacement direction and mechanically supporting the screen device when at least partly pushed out of the stowage volume, the support element having a fixed height and the screen device being displaceable in the predetermined displacement direction relative to the support element,
wherein the first display region having a first height and a first inherent stiffness and, adjacent to the first display region, the second display region having a second height and a second inherent stiffness, less than the first inherent stiffness, and
wherein when the screen device is arranged in the stowage volume at least a portion of the second display region is curved.

2. The display device as claimed in claim 1,
wherein the support element has at least one guide element, and
wherein the screen device is positively guided by the at least one guide element along the predetermined displacement direction beyond the support element.

3. The display device as claimed in claim 2, further comprising at least one pivoting mechanism to displace the screen device between the stowed position and the at least one use position depending on a control signal.

4. The display device as claimed in claim 3, wherein the at least one pivoting mechanism is arranged in the interior space of the stowage volume and pushes the screen device from the stowed position, continuously variably depending on the control signal, into at least one intermediate position and maintains the screen device in the at least one intermediate position.

5. The display device as claimed in claim 1, wherein the first inherent stiffness is caused by at least one of a materially and structurally stiffened carrier layer arranged on the screen device within the first display region.

6. The display device as claimed in claim 5,
wherein a height of the support element corresponds at least to the first height of the first display region,
wherein in the stowed position an upper edge of the first display region terminates flush with an upper edge of the support element, and
wherein in at least one of the use position and the intermediate position, the first display region projects beyond the upper edge of the support element at least in sections and the second display region is supported by the support element at least in sections.

7. The display device as claimed in claim 6, wherein the screen device has a touch-sensitive sensor layer.

8. The display device as claimed in claim 1, further comprising at least one pivoting mechanism to displace the screen device between the stowed position and the at least one use position depending on a control signal.

9. The display device as claimed in claim 8, wherein the at least one pivoting mechanism is arranged in the interior space of the stowage volume and pushes the screen device from the stowed position, continuously variably depending on the control signal, into at least one intermediate position and maintains the screen device in the at least one intermediate position.

10. The display device as claimed in claim 1,
wherein the first display region having a first height and a first inherent stiffness and, adjacent to the first display region, the second display region having a second height and a second inherent stiffness, less than the first inherent stiffness, and wherein when the screen device is arranged in the stowage volume at least a portion of the second display region is curved.

11. The display device as claimed in claim 10, wherein the first inherent stiffness is caused by at least one of a materially and structurally stiffened carrier layer arranged on the screen device within the first display region.

12. The display device as claimed in claim 10, wherein a height of the support element corresponds at least to the first height of the first display region, wherein in the stowed position an upper edge of the first display region terminates flush with an upper edge of the support element, and wherein in at least one of the use position and the intermediate position, the first display region projects beyond the upper edge of the support element at least in sections and the second display region is supported by the support element at least in sections.

13. A motor vehicle comprising:

a passenger compartment enclosing an interior; and a display device, including a stowage volume, having an opening;

a screen device displaceable through the opening of the stowage volume along a predetermined displacement direction between a stowed position and at least one use position, different than the stowed position, out of an interior space of the stowage volume and into the interior of the passenger compartment, then back into the interior space of the stowage volume, the screen device including a first display region being rigid, a second display region being flexible, and a display layer extending over the first display region and the second display region; and a support element which extends away from the interior space of the stowage volume proceeding from the opening along the predetermined displacement direction and mechanically supporting the screen device when at least partly pushed out of the stowage volume, the support element having a fixed height and the screen device being displaceable in the predetermined displacement direction relative to the support element, wherein the first display region having a first height and a first inherent stiffness and, adjacent to the first display region, the second display region having a second height and a second inherent stiffness, less than the first inherent stiffness, and wherein when the screen device is arranged in the stowage volume at least a portion of the second display region is curved.

14. The motor vehicle as claimed in claim 13, further comprising at least one pivoting mechanism to displace the screen device between the stowed position and the at least one use position depending on a control signal.

15. The motor vehicle as claimed in claim 14, wherein the at least one pivoting mechanism is arranged in the interior space of the stowage volume and pushes the screen device from the stowed position, continuously variably depending on the control signal, into at least one intermediate position and maintains the screen device in the at least one intermediate position.

16. The motor vehicle as claimed in claim 13, wherein the first inherent stiffness is caused by at least one of a materially and structurally stiffened carrier layer arranged on the screen device within the first display region.

17. The motor vehicle as claimed in claim 13, wherein a height of the support element corresponds at least to the first height of the first display region, wherein in the stowed position an upper edge of the first display region terminates flush with an upper edge of the support element, and wherein in at least one of the use position and the intermediate position, the first display region projects beyond the upper edge of the support element at least in sections and the second display region is supported by the support element at least in sections.

18. A method for displaying display content by a display device having a screen device and a stowage volume, comprising:

mounting the screen device displaceable through an opening of the stowage volume;

moving the screen device along a predetermined displacement direction between a stowed position and at least one use position, different than the stowed position, out of an interior space of the stowage volume where a support element which extends away from the interior space of the stowage volume proceeding from the opening along the predetermined displacement direction mechanically supports the screen device when at least partly pushed out of the stowage volume, the support element having a fixed height and the screen device being displaceable in the predetermined displacement direction relative to the support element, the screen device including a first display region being rigid, a second display region being flexible, and a display layer extending over the first display region and the second display region; and displaying the display content on the screen device when in the at least one use position, wherein the first display region having a first height and a first inherent stiffness and, adjacent to the first display region, the second display region having a second height and a second inherent stiffness, less than the first inherent stiffness, and wherein when the screen device is arranged in the stowage volume at least a portion of the second display region is curved.

\* \* \* \* \*